Figure 1:
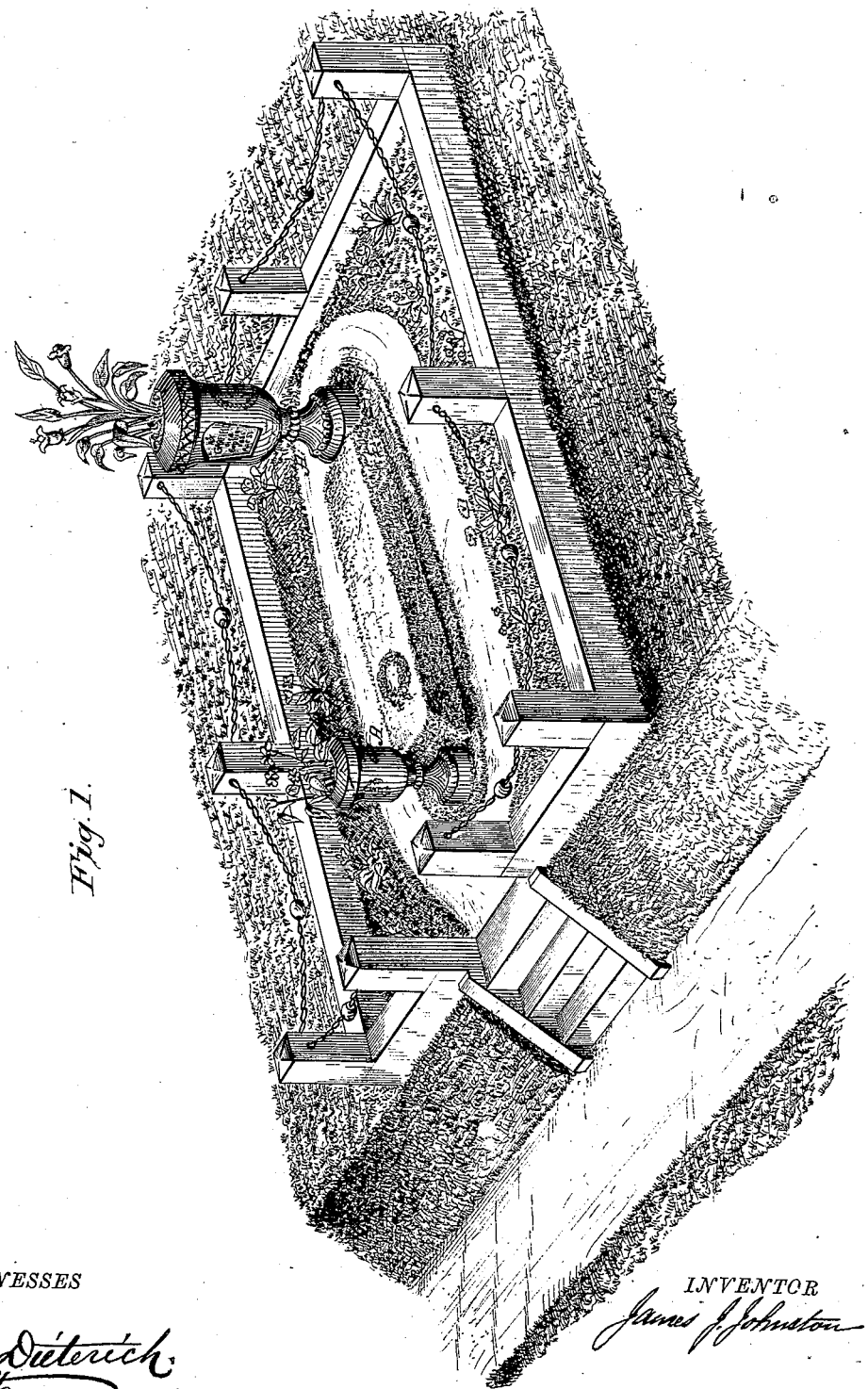

(No Model.) 2 Sheets—Sheet 1.

J. J. JOHNSTON.
MONUMENTAL VASE FOR FLOWERS.

No. 253,611. Patented Feb. 14, 1882.

WITNESSES

INVENTOR
James J. Johnston

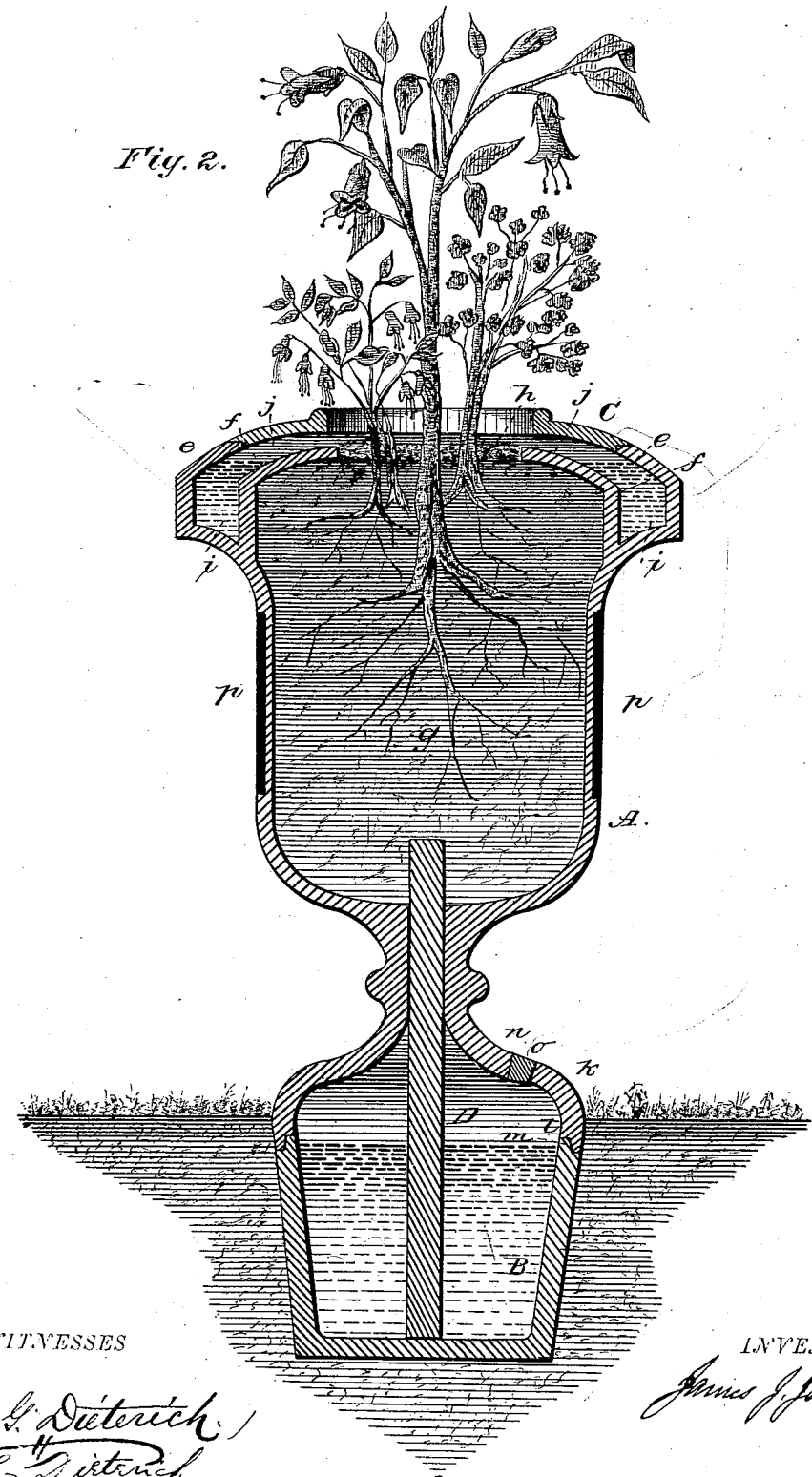

UNITED STATES PATENT OFFICE.

JAMES J. JOHNSTON, OF COLUMBIANA, OHIO.

MONUMENTAL VASE FOR FLOWERS.

SPECIFICATION forming part of Letters Patent No. 253,611, dated February 14, 1882.

Application filed December 23, 1881. (No model.)

*To all whom it may concern:*

Be it known that I, JAMES J. JOHNSTON, of Columbiana, in the county of Columbiana and State of Ohio, have invented a certain new and useful Improvement in Monumental Vases for Flowers; and I do hereby declare that the following is a full, clear, and exact description thereof, reference being had to the accompanying drawings, and to the letters of reference marked thereon.

The nature of my invention consists in constructing a vase with a base for holding water and serves the purpose of a pedestal for the flower-vase, which is provided with a hard and porous shaft leading from the bottom of said base up into the earth-chamber of the vase, which is furnished with a water and air chamber at its upper end, the whole constructed, arranged, and operating as will hereinafter more fully and at large appear.

To enable others skilled in the art with which my invention is most nearly connected to make and use it, I will proceed to describe its construction and operation.
In the accompanying drawings, which form part of this specification, Figure 1 is a perspective view of a cemetery-lot and a grave furnished with my improvement in monumental vase. Fig. 2 is a vertical section of said vase and its base.

The vase A, base B, and cap C may be constructed of terra-cotta, metal, or other suitable material; but preference is given to the first-mentioned material on account of its cheapness.

The porous shaft D may be constructed of any good brick-clay, and should be burned medium hard, similar to front building-brick.

The vase A has at its upper end arched walls $e$ and $f$, the wall $f$ covering the upper end of the earth-chamber $g$, excepting that portion marked $h$, through which the stems of the flowers project. The wall $e$ and lid or cap C cover the wall $f$ and form, in combination with wall $f$, the water-chamber $i$ and air-space $j$. This arrangement of the walls $e f$, cap C, and water-chamber $i$ will protect the earth in chamber $g$ from the direct action of the sun on said earth, and the water in chamber $i$, in the process of being vaporized, will impart the desired humidity to the flower planted in the vase.

The porous shaft D extends from the bottom of base B up through the foot portion $k$ of the vase A, into the earth-chamber $g$, and is used for imparting moisture to the earth in chamber $g$ by capillary attraction of the water placed in the base B.

The foot $k$ of the vase is recessed at $l$ for the reception of the ledge $m$ on the upper and inner edge of the base B. By this arrangement of the recess $l$ and ledge $m$, and by having the joint thus formed below the surface of the ground, as shown in Fig. 2, all undue evaporation of the water in the base B will be prevented, and the vase A will be held firmly upon the base, which serves the purpose of a pedestal for the vase. In the foot $k$ of vase A is an opening, $n$, furnished with a close-fitting plug, $o$. This opening is used for filling the base B with water. In the side walls of the vase A are one or more recesses, $p$, for receiving a tablet or tablets for monumental inscription or inscriptions, as shown in Fig. 1.

By constructing a monumental vase as hereinbefore described flowers planted in said vase will be kept fresh and vigorous with but little care and at long intervals of time, and such vase will form a cheap, pleasing, beautiful, and highly-ornamental monument for graves and lots in cemeteries, placing it within the reach of the poor and humble to decorate the grave of their dead with a monument equal in beauty to that of the most costly kind.

Having thus described my improvement, what I claim as of my invention is—

1. A monumental vase consisting of the base B, hard and porous shaft D, and vase A, having a water-chamber, $i$, arched wall $e$, having opening $h$, and a curved wall, $f$, substantially as herein described, and for the purpose set forth.

2. A monumental vase consisting of the base B, hard and porous shaft D, vase A, having recessed side walls for the reception of inscription tablet or tablets, water-chamber $i$, arched wall $e$, having opening $h$, an arched wall, $f$, and cap C, forming air-space $j$, substantially as herein described, and for the purpose set forth.

JAMES J. JOHNSTON.

Witnesses:
D. C. ALLEN,
JNO. W. STOCKETT.